US012078069B2

(12) United States Patent
Tardif et al.

(10) Patent No.: US 12,078,069 B2
(45) Date of Patent: Sep. 3, 2024

(54) ROTOR WITH FEATHER SEALS

(71) Applicant: PRATT & WHITNEY CANADA CORP., Longueuil (CA)

(72) Inventors: Marc Tardif, Candiac (CA); Alexandre Seguin, Montréal (CA); Sylvain Vignola, Saint-Basile-le-Grand (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/938,736

(22) Filed: Oct. 7, 2022

(65) Prior Publication Data

US 2024/0117748 A1 Apr. 11, 2024

(51) Int. Cl.
*F01D 11/00* (2006.01)
*F01D 5/30* (2006.01)
*F01D 5/22* (2006.01)

(52) U.S. Cl.
CPC .......... *F01D 11/008* (2013.01); *F01D 5/3007* (2013.01); *F01D 11/006* (2013.01); *F01D 5/22* (2013.01); *F05D 2220/323* (2013.01); *F05D 2240/55* (2013.01); *F05D 2240/80* (2013.01)

(58) Field of Classification Search
CPC ........ F01D 11/006; F01D 11/008; F01D 5/22; F01D 5/3007; F01D 5/10; F05D 2240/57; F05D 2260/96
See application file for complete search history.

(56) References Cited

U.S. PATENT DOCUMENTS 5,785,499 A * 7/1998 Houston .................... F01D 5/22 416/500
5,827,047 A * 10/1998 Gonsor ................. F01D 11/008 416/193 A
5,924,699 A * 7/1999 Airey .................... F01D 11/006 277/411
6,171,058 B1 * 1/2001 Stec .......................... F01D 5/22 416/193 A
6,932,575 B2 * 8/2005 Surace ....................... F01D 5/22 416/193 A (Continued)

OTHER PUBLICATIONS

European Search Report issued in EP counterpart Application No. 23202529 on Mar. 19, 2024.

*Primary Examiner* — Brian P Wolcott
*Assistant Examiner* — Behnoush Haghighian
(74) *Attorney, Agent, or Firm* — NORTON ROSE FULBRIGHT CANADA LLP

(57) ABSTRACT

A rotor assembly has: blades having airfoils and roots protruding from platform segments; a rotor disc having a peripheral face defining recesses, and slots, a recess located between two adjacent ones of the slots and bounded by a step; feather seals located radially between the peripheral face and the platform segments, a feather seal having a core extending from a trailing end to a leading end and overlapping a gap defined between two platform segments and tabs protruding from the core, the tabs including: trailing tabs positioned axially outside the recess; and leading tabs, a leading tab extending from a root to a tip and having one or more of: the tip axially positioned outside of the recess; and a fillet at an intersection between the tip and an edge of the leading tab, the edge extending between the tip and the core, and facing the step.

20 Claims, 4 Drawing Sheets

(56) References Cited

U.S. PATENT DOCUMENTS

| | | | | |
|---|---|---|---|---|
| 7,121,800 | B2 * | 10/2006 | Beattie | F01D 5/22 416/193 A |
| 7,214,034 | B2 * | 5/2007 | Giot | F01D 5/3015 416/193 A |
| 8,011,892 | B2 * | 9/2011 | Ramlogan | F01D 5/22 416/193 A |
| 8,661,641 | B2 * | 3/2014 | Lecuyer | B23P 19/10 29/466 |
| 9,121,293 | B2 | 9/2015 | Calza et al. | |
| 9,810,075 | B2 * | 11/2017 | Lana | F01D 5/3007 |
| 9,822,644 | B2 * | 11/2017 | Tardif | F01D 5/22 |
| 9,863,257 | B2 * | 1/2018 | Snyder | B33Y 80/00 |
| 9,951,625 | B2 * | 4/2018 | Congratel | F01D 11/006 |
| 10,113,434 | B2 * | 10/2018 | Snyder | F01D 5/22 |
| 10,125,615 | B2 * | 11/2018 | Congratel | F01D 5/22 |
| 10,724,386 | B2 * | 7/2020 | Thistle | F01D 11/003 |
| 10,934,874 | B2 * | 3/2021 | Sanzari | F01D 5/147 |
| 11,377,967 | B2 * | 7/2022 | Skidelsky | F01D 11/006 |
| 2016/0273367 | A1 | 9/2016 | Lana et al. | |
| 2020/0123912 | A1 | 4/2020 | Sanzari et al. | |
| 2020/0248576 | A1 | 8/2020 | Sanzari et al. | |

* cited by examiner

ROTOR WITH FEATHER SEALS

TECHNICAL FIELD

The disclosure relates generally to aircraft engines and, more particularly, to rotors used in such aircraft engines.

BACKGROUND

Aircraft engines, such as gas turbine engines, include rotors in compressor and/or turbines which usually include circumferentially spaced blades extending radially outwardly from a rotor disc and mounted thereto. The blades of such rotors are disposed within an air passage and typically face an upstream flow, such as pressurized air and/or hot combustion gases, that may infiltrate interstitial spaces between attached components of the rotors. Secondary air at a lower temperature may also infiltrate these interstitial spaces between attached components of the rotors. The presence of such colder secondary air may have a positive impact on the performance and/or durability of the rotor discs, seals and/or blades of rotors. However, secondary air ingested in such interstitial spaces may leak out via air leakage paths, which can limit the performance of rotor discs, seals and/or blades of such rotors.

SUMMARY

In one aspect, there is provided a rotor assembly for an aircraft engine, comprising: blades circumferentially distributed about a central axis, the blades having airfoils and roots protruding from opposite sides of platform segments; a rotor disc having a peripheral face and slots extending radially inward from the peripheral face toward the central axis, the peripheral face extending from a first axial face of the rotor disc to a second axial face of the rotor disc, the roots of the blades being received within the slots along a blade insertion direction extending from the first axial face to the second axial face, the peripheral face defining recesses proximate the second axial face, a recess of the recesses located between two adjacent ones of the slots, the recess bounded by a step, the recess located axially between the step and the second axial face relative to the central axis; feather seals located radially between the peripheral face of the rotor disc and the platform segments of the blades, a feather seal of the feather seals having a core axially extending from a trailing end proximate the first axial face to a leading end proximate the second axial face, the core circumferentially overlapping a gap defined between two adjacent ones of the platform segments and tabs protruding from the core, the tabs including: trailing tabs proximate the trailing end of the core and positioned axially outside the recess; and leading tabs located axially between the trailing tabs and the second axial face, a leading tab of the leading tabs extending from a root at the core to a tip, the leading tab having one or more of: the tip axially positioned outside of the recess; and a fillet at an intersection between the tip and an edge of the leading tab, the edge extending between the tip and the core, and facing the step.

The rotor assembly described above may include any of the following features, in any combinations.

In some embodiments, the step has a height taken in a radial direction relative to the central axis, the fillet having a radius greater than the height.

In some embodiments, the radius of the fillet is at least 1.5 times the height of the step.

In some embodiments, the radius is about two times the height of the step.

In some embodiments, the radius is at most a width of the leading tab taken along the blade insertion direction.

In some embodiments, the leading tab is axially aligned with the recess and defines the fillet.

In some embodiments, the leading tab is a first lateral leading tab protruding from the core transversally to the blade insertion direction.

In some embodiments, the leading tabs includes a second lateral leading tab protruding from the core transversally to the blade insertion direction and away from the first lateral leading tab, the second lateral leading tab being axially offset from the first lateral leading tab.

In some embodiments, the second lateral leading tab is axially offset from the recess.

In some embodiments, the second lateral leading tab defines a second fillet, a second radius of the second fillet being at least 1.5 times a height of the step taken in a radial direction relative to the central axis.

In some embodiments, the core defines a dimple between the first lateral leading tab and a trailing tab of the trailing tabs, the dimple matingly engaged by a bump of a segment of the platform segments.

In some embodiments, the leading tabs include a longitudinal leading tab protruding from the core, the trailing tabs including a longitudinal trailing tab protruding from the core, the longitudinal leading tab and the longitudinal trailing tab extending away from one another, the longitudinal trailing tab positioned axially outside the recess, the longitudinal leading tab axially aligned with the recess, the longitudinal leading tab located forward of the leading tab relative to the blade insertion direction.

In another aspect, there is provided a turbine section of an aircraft engine comprising a rotor assembly having: blades circumferentially distributed about a central axis, the blades having airfoils and roots protruding from opposite sides of platform segments; a rotor disc having a peripheral face and slots extending radially inward from the peripheral face toward the central axis, the peripheral face extending from a first axial face of the rotor disc to a second axial face of the rotor disc, the roots of the blades being received within the slots along a blade insertion direction, the roots being removable from the slots solely along a direction opposite the blade insertion direction, the peripheral face defining recesses, a recess of the recesses located between two adjacent ones of the slots, the recess bounded by a step, the recess located forward of the step relative to the blade insertion direction; feather seals located radially between the peripheral face of the rotor disc and the platform segments of the blades, a feather seal of the feather seals having a core circumferentially overlapping a gap defined between two adjacent ones of the platform segments and tabs protruding from the core, the tabs including: trailing tabs axially offset from the recess, and leading tabs axially forward of the trailing tabs relative to the blade insertion direction, a leading tab of the leading tabs extending from a root at the core to a tip, the leading tab having one or more of: the tip axially positioned outside of the recess; and a fillet at an intersection between the tip and an edge of the leading tab, the edge extending between the tip and the core, and facing the step.

The turbine section described above may include any of the following features, in any combinations.

In some embodiments, the step has a height taken in a radial direction relative to the central axis, the fillet having a radius greater than the height and/or wherein the radius is at most a width of the leading tab taken along the blade insertion direction.

In some embodiments, the leading tab is axially aligned with the recess and defines the fillet.

In some embodiments, the leading tab is a first lateral leading tab protruding from the core transversally to the blade insertion direction.

In some embodiments, the leading tabs includes a second lateral leading tab protruding from the core transversally to the blade insertion direction and away from the first lateral leading tab, the second lateral leading tab being axially offset from the first lateral leading tab, the second lateral leading tab axially offset from the recess.

In yet another aspect, there is provided a feather seal for a rotor assembly of an aircraft engine, the feather seal comprising: a core extending along a longitudinal axis from a from a leading end to a trailing end, the feather seal having a seal insertion direction extending from the trailing end to the leading end, the feather seal being insertable between blades and a rotor disc solely along the seal insertion direction; tabs protruding from the core from roots at the core to tips, the tips being offset from the roots along a vertical direction normal to the longitudinal axis, the tabs including trailing tabs, and leading tabs axially forward of the trailing tabs relative to the seal insertion direction, a leading tab of the leading tabs defining a fillet at an intersection between a corresponding tip of the tips and an edge of the leading tab, the edge facing a trailing tab of the trailing tabs.

The feather seal described above may include any of the following features, in any combinations.

In some embodiments, the intersection is free of a sharp corner.

In some embodiments, a ratio of a radius of the fillet to a length of the leading tab from the corresponding tip to a corresponding root of the roots ranges from 0.25 to 0.75.

BRIEF DESCRIPTION OF THE DRAWINGS

Reference is now made to the accompanying figures in which.

DETAILED DESCRIPTION

Figure 1:
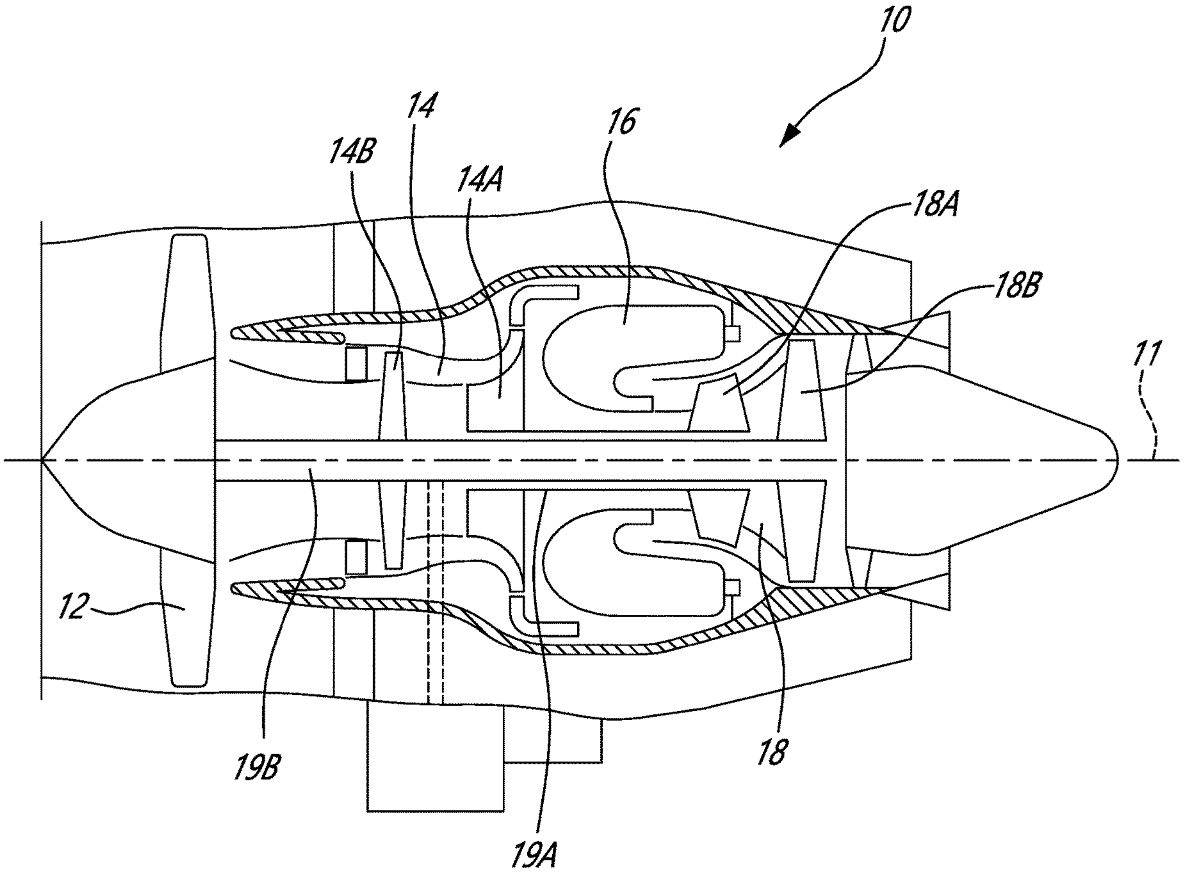
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 19A drivingly engaging a high-pressure turbine 18A of the turbine section 18 to a high-pressure compressor 14A of the compressor section 14, and a low-pressure spool having a low-pressure shaft 19B drivingly engaging a low-pressure turbine 18B of the turbine section 18 to a low-pressure compressor 14B of the compressor section 14 and drivingly engaged to the fan 12. It will be understood that the contents of the present disclosure may be applicable to any suitable engines, such as turboprops, turboshafts, and auxiliary power units (APUs) without departing from the scope of the present disclosure.

Figure 2:
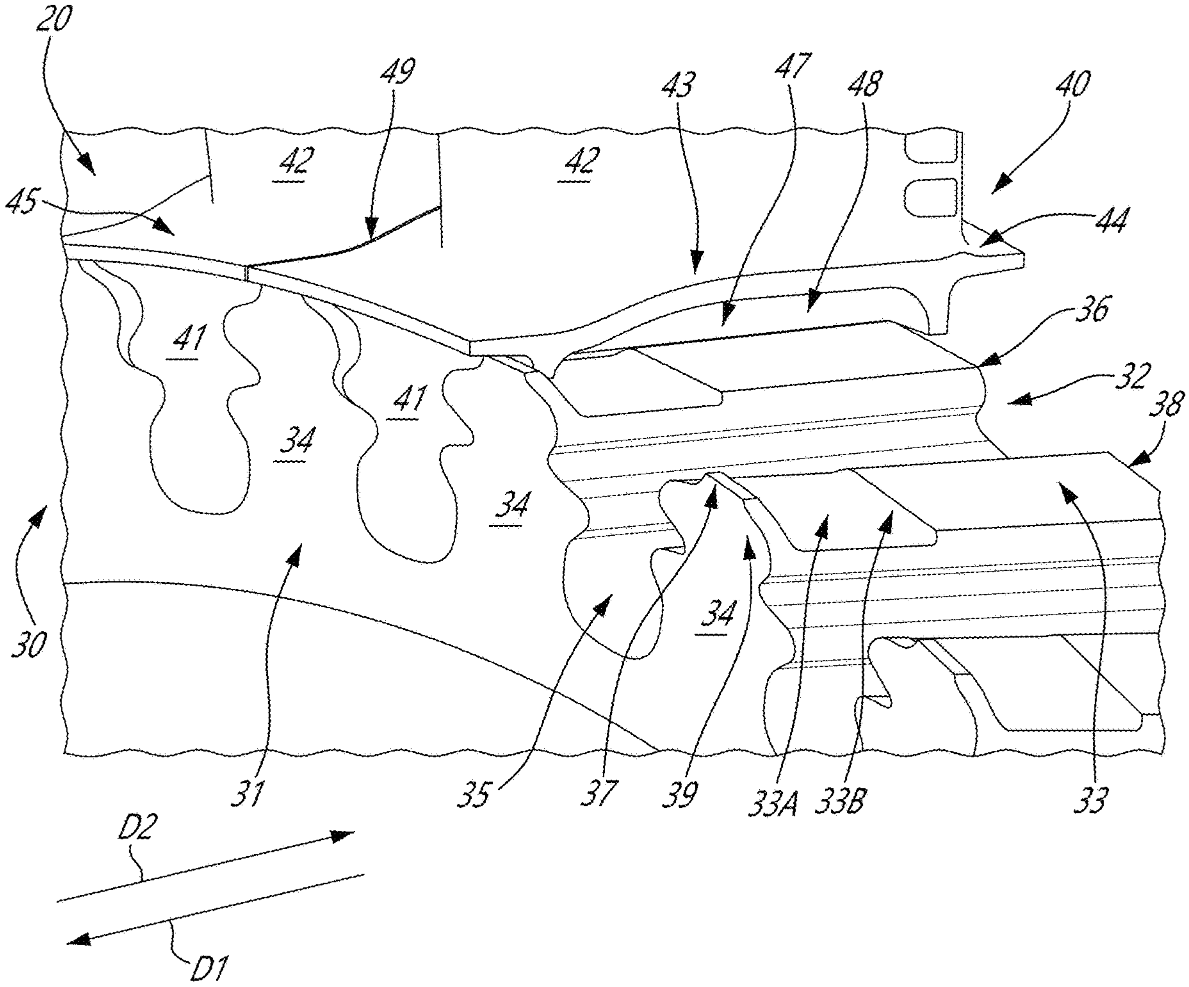
FIG. 2 is a fragmentary three dimensional view of a rotor assembly used in the gas turbine engine of FIG. 1.

Referring to FIGS. 1-2, the gas turbine engine 10 includes a plurality of rotor assemblies 20. Such rotor assemblies 20 may be located in the compressor section 14 and in the turbine section 18. The contents of the present disclosure pertain to a rotor assembly 20 of the turbine section 18, more specifically of the high-pressure turbine 18A. It may be applicable to the low-pressure turbine 18B.

Referring to FIG. 2, a rotor assembly 20 is shown and includes a rotor disc 30 (partially shown) and rotor blades 40 surrounding and rotating with one of the shaft (e.g., high-pressure shaft 19A, low-pressure shaft 19B) of the gas turbine engine 10 along the central axis 11 (FIG. 1). In an embodiment, the rotor assembly 20 may form part of an axial compressor disposed in a core flow path of the gas turbine engine 10. In another embodiment, the rotor assembly 20 may form part of an axial turbine of the turbine section 18.

In embodiments where the rotor assembly 20 is disposed in the turbine section 18 of the engine downstream of the combustor 16, the components of the rotor assembly 20 may have to sustain high pressures and temperatures during operation of the gas turbine engine 10. Such operating conditions may affect the durability of said components. Hot combustion gases and/or air upstream of the rotor assembly 20 may infiltrate interstitial spaces between components connecting/interfacing together in the rotor assembly 20. However, colder air which circulates within the gas turbine engine 10 may reduce the temperature of the components in fluid communication with the hot combustion gases. In operation, such colder air (often referred to as secondary air) flowing upstream of the rotor assembly 20 may be ingested in these interstitial spaces between components connecting/interfacing together in the rotor assembly 20. Increasing said colder air retention in interstitial spaces between components of the rotor assembly 20 may be desirable in order to limit (reduce) the rate at which these components heat up during normal operation of the gas turbine engine 10 and/or so as to limit the negative impacts of infiltration of hot combustion gases through these interstitial spaces on the efficiency of the gas turbine engine 10 and/or limit the negative impacts of excessive secondary air flowing through these interstitial spaces. As discussed below, components of the rotor assembly 20 may be adapted to increase the retention of secondary air at selected locations about the rotor disc 30, more particularly at a disc/blades interface.

In the embodiment shown, the rotor assembly 20 comprises the rotor disc 30 and the rotor blades 40 distributed circumferentially about the central axis 11 and removably connected to the rotor disc 30. Multiple rotor assemblies 20 may be provided, each with an associated stator disposed either downstream (compressor) or upstream (turbine) of the rotor, such as to form multiple compressor or turbine stages as the case may be. These stages may correspond to compression stages or pressure stages in certain embodiments. The blades 40 may be equally circumferentially spaced apart from one another about the disc 30.

As seen in FIG. 2, the disc 30 has a front end portion 31, an opposite rear end portion 32 axially spaced apart therefrom, and a peripheral face 33 circumferentially extending about the disc 30 and extending axially from the front end portion 31 to the rear end portion 32. In an alternate embodiment, the portion labeled "31" may be a rear end portion of the disc 30 and the portion labeled "32" may be a front end portion of the disc 30. The front end portion 31 defines a front face and the rear end portion 32 defines a rear face of the disc 30 between which the peripheral face 33 of the disc 30 extends. In one particular embodiment, the front and rear faces are substantially parallel relative to each other and substantially perpendicular relative to the central axis 11 of the gas turbine engine 10. The front face and/or the rear face may form flat plane portions, to which the central axis 11 is normal when the rotor assembly 20 is installed in the gas turbine engine 10. In an embodiment, the rear face is a downstream surface of the rotor assembly 20 relative to a direction of the flow path of combustion gases in the turbine section 18. In another embodiment, the rear face may be the downstream surface of the rotor assembly 20 in the compressor section 14.

The rotor disc 30 has a plurality of fixing members 34 defined therein through the peripheral face 33 and circumferentially spaced apart from one another. As in FIG. 2, the fixing members 34 extend from the front face to the rear face of the disc 30. The fixing members 34 are radial projections of the disc 30, with a said fixing member 34 being substantially radially extending. The disc 30 includes a plurality of profiled slots 35 formed in the peripheral face 33, between pairs of adjacent ones of the fixing members 34, which are accordingly complimentarily formed by the slots 35. As depicted in FIG. 2, the slots 35 extend axially between the front face and the rear face of the rotor disc 30. Therefore, the rotor disc 30 has a circumferentially alternating sequence of fixing members 34 and slots 35. In an embodiment, the machining or fabricating of the slots 35 results in the presence of the fixing members 34. As the fixing members 34 and the slots 35 are circumferentially side by side, they have complementary shapes. The slots 35 extend axially from the front face to the rear face of the disc 30, in which a front slot opening and a rear slot opening are respectively defined. In some embodiments, the slots 35 may be skewed relative to a longitudinal axis of the rotor assembly 20. Stated differently, the slots 35 may extend along slot axes that may be non-parallel to the central axis 11. The slots 35 may be any suitable groove, opening and/or recess formed in the peripheral face 33 of the disc 30 to receive a generally complementary portion of one of the blades 40, which may be a root of the blades 40 as discussed later, in order to thereby connect, secure and/or attach the blade 40 onto the disc 30.

In an embodiment, the fixing members 34 have a profiled contour which may be, for example, formed by a series of lobes having increasing circumferential widths from the radially outermost lobe ("top lobe"), to the radially innermost lobe ("bottom lobe"), with, in some cases, a radially central lobe ("mid lobe") disposed therebetween and having an intermediate lobe width. Such a multi-lobed profiled contour is typically referred to as a "firtree" (or "fir tree"), because of this characteristic shape. It is to be understood from the above that the slots 35 may have a complementary firtree shape, as in some embodiments side walls of the slots 35 may define a respective side of the profiled contour of the fixing members 34. Whether or not in the shape of a firtree or lobes, the fixing members 34 and slots 35 define mechanical interferences that form abutments that prevent a radial outward movement of blades 40 connected to the disc 30.

As visible in FIG. 2, in an embodiment, opposite sides of the profiled contour of the fixing members 34 join at a radially outer tip 36 of a respective one of the fixing members 34 to form a planar top surface. The peripheral face 33 of the disc 30 forms the radially outer tip 36 of the fixing members 34. The peripheral face 33 may extend from a leading edge 37 towards a trailing edge 38. The fixing members 34 and slots 35 may have other profiled shapes in some embodiments.

Still referring to FIG. 2 , the rotor disc 30 has sealing tabs 39 defined in the front end portion 31, proximate the front face of the rotor disc 30. In alternate embodiment, the sealing tabs 39 may be defined in the rear end portion 32. More specifically, the sealing tabs 39 project radially outward relative to the radially outer tip 36 of the fixing members 34, and the sealing tabs 39 are axially disposed at, or near to, a front (i.e. upstream) end of the radially outer tip of the fixing members 34 of the disc 30. In alternate embodiment, the sealing tabs 39 may be axially disposed at, or near to, a rear (i.e. downstream) end of the radially outer tip. The sealing tabs 39 are circumferentially disposed between the slots 35. Stated differently, the sealing tabs 39 protrude radially out from the remainder of the peripheral face 33, at radially outer tip 36 of the fixing members 34. In the depicted embodiment, the sealing tabs 39 are integral parts of the disc 30 (i.e. an integral, monolithic, portion of a respective one of the fixing members 34), however the sealing tabs 39 may alternately be a separately formed part added/connected to the front end portion 31 of the disc 30 in alternate embodiments. Due to the presence of the sealing tabs 39 that project from the peripheral face 33 of the disc 30, more particularly at the radially outer tip 36 of the fixing members 34 proximate the front face of the rotor disc 30, a circumference of the disc 30 increases at the radially outer tip 36 of the fixing members 34, at the leading edge 37 of the peripheral face 33 of the disc 30.

Each of the blades 40 has a blade root 41, an airfoil 42 and a platform or platform segments 43 radially disposed between the blade root 41 and the airfoil 42, the platform segments 43 extending laterally to (into opposing relationship with) corresponding platform segments 43 of adjacent ones of the blades 40. Stated differently, the blades 40 have the airfoils 42 and the blade roots 41 protruding from opposite sides of the platform segments 43. These portions of the blade 40 may all merge together to form a single monolithic piece blade, though a multi-piece configuration is also possible.

The blade root 41 of each of the blades 40 may be received within a corresponding one of the slots 35 of the disc 30. The root 41 has a shape and size that dovetail with the shape and size of the corresponding slot 35. The size of the blade roots 41 is slightly smaller than or equal to the size of the slots 35 to allow the blade roots 41 to slide within the slots 35 along a blade insertion direction D1 when connecting the blades 40 to the disc 30. The blade insertion direction D1 extends from the rear axial face at the rear end portion 32 to the front axial face at the front end portion 31. In an alternate embodiment, the blade insertion direction D1 extends from the front axial face to the rear axial face. Once received in the slot 35, the blade root 41 may be secured therein with a retaining member (not shown). The retaining member may be any fastening structure such as a retaining ring, a rivet connector or any other suitable types of retaining member that may secure the blade roots 41 inside respective slots 35 to prevent axial movement between the blade roots 41 and the slots 35 in at least one direction, for instance the direction opposite the insertion direction of the blade root 41 within the slot 35.

The airfoil 42 of the blade 40 extends generally or partially transversally to the direction of the flow path of air/combustion gases in the core flow path 19 (FIG. 1). The airfoil 42 has a profiled shape adapted to generate a pressure/velocity differential across the rotor assembly 20 (or a section thereof) when air/combustion gases flow across the airfoils 42 when the rotor assembly 20 rotates during operation of the gas turbine engine 10.

The platform segment 43 has a curved profile forming a trailing flange 44 protruding rearwardly and a leading flange 45 protruding forwardly. As shown in FIG. 2, the curved profile defines a platform recess 47 on the root side of the platform segment 43 (underneath the platform segment 43). When the blades 40 are mounted on the disc 30, corresponding platform segments 43 of adjacent ones of the blades 40 mate in opposing relationship, such that the platform recesses 47 on the root side of the corresponding platform segments 43 together define a blade pocket 48, i.e., a global recess 48. Stated differently, the pockets 48 are circumscribed by adjacent platform segments 43 of respective adjacent blades 40 and the peripheral face 33 of the disc 30 when the blades 40 are mounted thereon.

As shown in FIG. 2, a gap 49 is located between each two circumferentially adjacent ones of the platform segments 43. In use, combustion gases may flow through these gaps 49. This is undesired since no work may be extracted from the combustion gases that exit the core flow path through these gaps 49. Blade feather seals are used to prevent or limit combustion gases from flowing through the gaps 49 between adjacent platform segments 43. This may improve turbine blade/stage aerodynamic efficiency. It may also protect blade under-platform pockets 48 and turbine disc 30 from being exposed to those hot combustion gases and residues which may be detrimental to their durability.

When used within the turbine section 18, and to ensure that a blade feather seal performs its functions, it may be made from a high-temperature-resistant material, have a shape conforming as closely as possible to the blade under-platform pocket's three-dimensional surface profile and be as light as possible to minimize its centrifugal load contribution on the rotor assembly 20. Feather seals may also have features such as side tabs that prevent them from moving within the pockets 48 and have a shape that may allow it to be made by stamping a pre-cut piece of sheet metal in a forming die.

As shown in FIG. 2, in the present embodiment, the peripheral face 33 defines a recess 33A bounded by a step 33B. The recess 33A is located forward of the step 33B relative to the blade insertion direction D1. In other words, the recess 33A is located axially between the front axial face at the front end portion 31 of the disc 30 and the step 33B. The recesses 33A may be used to obtain a precise measurement of a disk external diameter that will be monitored over the service life of the disk to evaluate its growth due to creep and to retire the disk from service once a creep growth limit has been reached. It has been observed that, in certain conditions, tabs of the feather seals may get caught on the step 33B rendering removal of the blades 40 and feather seals about a blade removal direction D2 opposite the blade insertion direction D1 quite cumbersome. The blades 40 may be removable from the slots 35 solely along the blade removal direction D2, which is opposite to the blade insertion direction D1. This may be caused by the sealing tabs 39 that may prevent the removal of the blades 40 in the blade insertion direction D1. In some cases, the removal of the blades 40 lead to damage in the different parts of the rotor assembly 20. Because of the sealing tabs 39, which act as mechanical stop, blades and feather seals may only be installed or removed from one side (e.g., downstream side) of the disc 30. The feather seal upstream side tabs may catch on the step 33B and the feather seal upstream tab may get jammed under the blade upstream rail when removing blades and feather seals from the disc along the blade removal direction D2. The feather seal of the present disclosure may at least partially alleviate these drawbacks.

Figure 3:
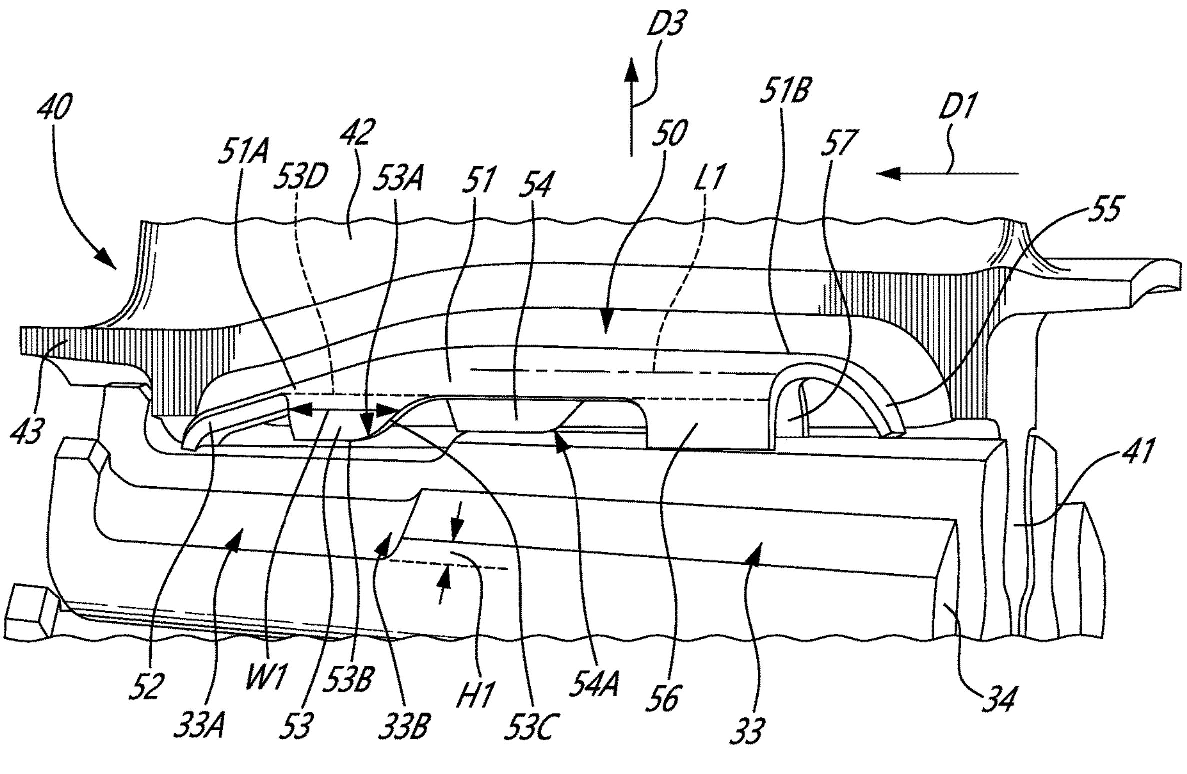
FIG. 3 is another fragmentary three dimensional view of the rotor assembly of FIG. 2 illustrating a feather seal in accordance with one embodiment.
Figure 4:
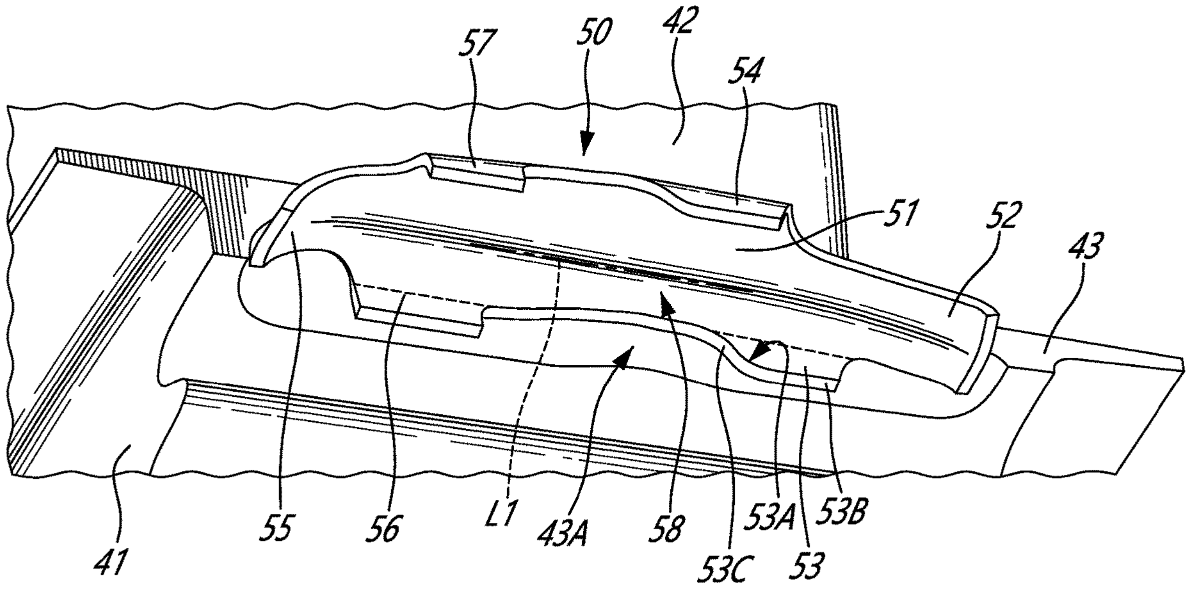
FIG. 4 is another fragmentary three dimensional view of the rotor assembly of FIG. 2 illustrating the feather seal.

Referring now to FIGS. 3-4, a feather seal 50 is shown assembled between a platform segment 43 and the peripheral face 33 of the rotor disc 30. The feather seal 50 is described below using the singular form, but the description below may apply to all of the feather seals 50 of the rotor assembly 20. The feather seals 50 are insertable between the blades 40 and the rotor disc 30 solely along the seal insertion direction, which corresponds herein to the blade insertion direction D1.

The feather seal 50 has a core 51 circumferentially overlapping one of the gaps 49 (FIG. 2) defined between two adjacent ones of the platform segments 43 and tabs protruding from the core 51. The core 51 extends along a longitudinal axis L1 from a leading end 51A to a trailing end 51B located rearward of the leading end 51A relative to the blade insertion direction D1. Herein, the expression "leading" and "trailing" in relationship to the feather seal 50 are relative to the direction of insertion D1. Thus, a "leading" part of the feather seal is inserted before a "trailing" part. The tabs extend from roots at the core 51 to tips. The roots area are depicted with dashed lines in FIGS. 3-4. The tips are free, distal ends, of the tabs. These tips abut the peripheral face 33 of the rotor disc 30 so as to maintain a contact between the core 51 and the platform segment 43 to seal the gap 49. The tips are offset from the roots along a vertical direction D3 being normal to the longitudinal axis L1 of the core 51. The vertical direction D3 may be substantially parallel to a radial direction relative to the central axis 11.

In the embodiment shown, the tabs include leading tabs and trailing tabs located rearward of the leading tabs relative to the blade insertion direction D1. The blade insertion direction D1 may correspond to a seal insertion direction along which the feather seals 50 and the blades 40 are inserted. These two directions may be parallel to each other. The leading tabs may include three leading tabs, namely, a longitudinal leading tab 52 protruding from the core 51 along the blade insertion direction D1, a first lateral leading tab 53 protruding from the core 51 transversally to the blade insertion direction D1, and a second lateral leading tab 54 protruding from the core 51 transversally to the blade insertion direction D1 and away from the first lateral leading tab 53. The second lateral leading tab 54 may be axially offset from the first lateral leading tab 53. In the embodiment shown, the first lateral leading tab 53 is located forward of the second lateral leading tab 54 relative to the blade insertion direction D1. The trailing tabs may include three trailing tabs, namely, a longitudinal trailing tab 55 protruding from the core 51 along the direction D2 opposite the blade insertion direction D1 and extending away from the longitudinal leading tab 52, a first lateral trailing tab 56 protruding from the core 51 transversally to the blade insertion direction D1, and a second lateral trailing tab 57 protruding from the core 51 transversally to the blade insertion direction D1 and away from the first lateral trailing tab 56.

The leading and trailing tabs 52, 53, 54, 55, 56, 57 extend from roots at the core 51 to tips. The tips of the leading and trailing tabs 52, 53, 54, 55, 56, 57 are in abutment against the peripheral face 33 of the rotor disc 30. The trailing tabs 55, 56, 57 abut the peripheral face 33 outside the recess 33A. In the embodiment shown, at least two of the leading tabs 52, 53, 54 abut the peripheral face 33 within the recess 33A. The longitudinal leading tab 52 has its tip axially aligned with the recess 33A; said tip may thus abut the peripheral face 33 within the recess 33A. The longitudinal trailing tab 55 has its tip axially offset from the recess 33A; said tip may thus abut the peripheral face 33 outside the recess 33A.

To prevent the first and second lateral leading tabs 53, 54 from getting caught on the step 33B while removing the feather seals 50 and the blades 40 along the blade removal direction D2, the first lateral leading tab 53 may have one or more of its tip axially positioned outside the recess 33A, and a fillet at an intersection between its tip and an edge of the first lateral leading tab 53; the edge extending between the tip and the core 51 and facing the step 33B. Similarly, the second lateral leading tab 54 may have one or more of its tip axially positioned outside the recess 33A, and a fillet at an intersection between its tip and an edge of the second lateral leading tab 54; the edge extending between the tip and the core 51 and facing the step 33B. In the present embodiment, the first lateral leading tab 53 is axially aligned with the recess 33A. The first lateral leading tab 53 may thus abut the peripheral face 33 within the recess 33A. The second lateral leading tab 54 is positioned axially outside the recess 33A. The second lateral leading tab 54 is thus axially offset from the recess 33A. The second lateral leading tab 54 may thus abut the peripheral face 33 outside the recess 33A. In an alternate embodiment, both of the first and second lateral leading tabs 53, 54 may be positioned axially outside the recess 33A and may thus abut the peripheral face 33 outside the recess 33A. The first lateral leading tab 53, which is axially aligned with the recess 33A, defines a fillet 53A at an intersection between its tip 53B and an edge 53C that faces the step 33B. This edge 53C faces the first lateral trailing tab 56. A radius of the fillet 53A is greater than a height H1 of the step 33B. The height H1 is taken in a radial direction relative to the central axis 11. Preferably, the radius of the fillet 53A is at least 1.5 times the height H1 of the step 33C. The radius of the fillet 53A may be at least 2 times the height H1 of the step 33C. The radius of the fillet 53A may be at most a width W1 of the first lateral leading tab 53 taken along the blade insertion direction D1. The width W1 may be an average width of the first lateral leading tab 53 since the width may vary from the root to the tip. It may be the width at the root or, alternatively, the width at the tip. The height H1 may be about 0.02 inch whereas the radius may be about 0.06 inch. The expression "about" in the present disclosure encompasses variations by plus or minus 20%. A ratio of the radius of the fillet 53A to a length of the first lateral leading tab 53 from its root 53D to its tip 53B may range from 0.25 to 0.75. In the embodiment shown, the second lateral leading tab 54 also defines a second fillet 54A between its tip and an edge facing the second lateral trailing tab 57. The second fillet 54A may have a second radius at least 1.5 times, preferably 2 times, the height H1 of the step 33B. The second radius may have the same characteristics as the radius of the fillet 53A of the first leading lateral tab 53. The second lateral leading tab 54 may be free of this second fillet 54A since its is located outside the recess 33A and, thus, may be less subjected to be caught on the step 33B. The lateral leading tabs abutting the peripheral face 33 within the recess 33A may be free of a sharp corner to limit chances of these tabs getting caught on the step 33B.

Referring more particularly to FIG. 4, in the depicted embodiment, the core 51 defines dimple 58 between the first lateral leading tab 53 and the first lateral trailing tab 56. The dimple 58 may be matingly engaged by a bump 43A defined by a platform segment 43. The presence of this bump 43A and dimple 58 may require the first lateral leading tab 53 to be located axially forward of the second lateral leading tab 54 and thus within the recess 33A. Moving the first lateral leading tab 53 rearward such that it sits outside the recess 33A may create manufacturing issues since a stamping process used to manufacture the feather seal may be unable to create such complex three-dimensional curved surface.

The feather seal 50 described herein includes upstream side tabs having large fillets at their free end. One of these two upstream side tabs is located further downstream than the other to ensure that it always sits on the upper portion of the disc outer diameter step. This may further reduce the risk of back-lock when removing the blades 40 and the feather seals 50 from the disc 30 along the blade removal direction D2. The axial position of the other upstream side tab is located to avoid interaction with the dimple 58 of the core 51 to avoid stamping/manufacturing issues during manufacturing of the feather seal 50. In fact, the feather seal 50 may be cut from sheet metal in a coplanar or two dimensional configuration to create a blank. A three dimensional shape may be imparted to the blank by stamping said blank.

The disclosed feather seal 50 may improve sealing efficiency and may eliminate assembly mistake, which may cause loss of sealing efficiency and high bending loads within the seal itself as it may not sit properly in the pocket 48.

In an alternate embodiment, each of the leading and trailing lateral tabs may be three-tangent at their tips. In other words, tips of the leading and trailing lateral tabs may be circular and my have a radius corresponding to a width of said tabs. Put differently, each of the leading and trailing lateral tabs may be free of sharp corner on all sides.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A rotor assembly for an aircraft engine, comprising:

blades circumferentially distributed about a central axis, the blades having airfoils and roots protruding from opposite sides of platform segments;

a rotor disc having a peripheral face and slots extending radially inward from the peripheral face toward the central axis, the peripheral face extending from an upstream axial face of the rotor disc to a downstream axial face of the rotor disc, the roots of the blades being received within the slots along a blade insertion direction extending between the upstream axial face and the downstream axial face, the peripheral face defining recesses proximate the downstream axial face, a recess of the recesses located between two adjacent ones of the slots, the recess bounded by a step, the recess located axially between the step and one of the upstream axial face and the downstream axial face relative to the central axis;

feather seals located radially between the peripheral face of the rotor disc and the platform segments of the blades, a feather seal of the feather seals having a core axially extending from a trailing end proximate one of the upstream axial face and the downstream axial face to a leading end proximate the other of the upstream axial face and the downstream axial face along the blade insertion direction, the core circumferentially overlapping a gap defined between two adjacent ones of the platform segments and tabs protruding from the core, the tabs including:

trailing tabs proximate the trailing end of the core and positioned axially outside the recess; and leading tabs proximate the leading end of the core, a leading tab of the leading tabs extending from a root at the core to a tip, the leading tab extending radially and circumferentially away from the core relative to the central axis from the root to the tip, the leading tab located within the recess and having:

a radially-inner edge face at the tip, the radially-inner edge face facing the recess and facing a radially inward direction towards the central axis;

a lateral edge face extending in a direction having a radial component relative to the central axis from the core towards the tip, the lateral edge face facing a direction having an axial component relative to the central axis; and a fillet at an intersection between the radially-inner edge face and the lateral edge face of the leading tab, the fillet at least partially received inside the recess, the fillet facing the step and configured to abut the step during a movement of the leading tab in a blade removal direction opposite the blade insertion direction.

2. The rotor assembly of claim 1, wherein the step has a height taken in a radial direction relative to the central axis, the fillet having a radius greater than the height.

3. The rotor assembly of claim 2, wherein the radius of the fillet is at least 1.5 times the height of the step.

4. The rotor assembly of claim 3, wherein the radius is about two times the height of the step.

5. The rotor assembly of claim 2, wherein the radius is at most a width of the leading tab taken along the blade insertion direction.

6. The rotor assembly of claim 1, wherein the leading tab is axially aligned with the recess and defines the fillet.

7. The rotor assembly of claim 6, wherein the leading tab is a first lateral leading tab protruding from the core transversally to the blade insertion direction.

8. The rotor assembly of claim 7, wherein the leading tabs includes a second lateral leading tab protruding from the core transversally to the blade insertion direction and away from the first lateral leading tab, the second lateral leading tab being axially offset from the first lateral leading tab.

9. The rotor assembly of claim 8, wherein the second lateral leading tab is axially offset from the recess.

10. The rotor assembly of claim 8, wherein the second lateral leading tab defines a second fillet, a second radius of the second fillet being at least 1.5 times a height of the step taken in a radial direction relative to the central axis.

11. The rotor assembly of claim 8, wherein the core defines a dimple between the first lateral leading tab and a trailing tab of the trailing tabs, the dimple matingly engaged by a bump of a segment of the platform segments.

12. The rotor assembly of claim 1, wherein the leading tabs include a longitudinal leading tab protruding from the core, the trailing tabs including a longitudinal trailing tab protruding from the core, the longitudinal leading tab and the longitudinal trailing tab extending away from one another, the longitudinal trailing tab positioned axially outside the recess, the longitudinal leading tab axially aligned with the recess, the longitudinal leading tab located forward of the leading tab relative to the blade insertion direction.

13. A turbine section of an aircraft engine comprising a rotor assembly having:

blades circumferentially distributed about a central axis, the blades having airfoils and roots protruding from opposite sides of platform segments;

a rotor disc having a peripheral face and slots extending radially inward from the peripheral face toward the central axis, the peripheral face extending axially between an upstream axial face of the rotor disc to a downstream axial face of the rotor disc, the roots of the blades being received within the slots along a blade insertion direction extending between the upstream axial face and the downstream axial face, the roots being removable from the slots solely along a direction opposite the blade insertion direction, the peripheral face defining recesses, a recess of the recesses located between two adjacent ones of the slots, the recess bounded by a step, the recess located axially between the step and one of the upstream axial face and the downstream axial face relative to the central axis;

feather seals located radially between the peripheral face of the rotor disc and the platform segments of the blades, a feather seal of the feather seals having a core circumferentially overlapping a gap defined between two adjacent ones of the platform segments and tabs protruding from the core, the tabs including:

trailing tabs proximate one of the upstream axial face and the downstream axial face and being axially offset from the recess, and leading tabs proximate the other of the upstream axial face and the downstream axial face, a leading tab of the leading tabs extending from a root at the core to a tip, the leading tab extending radially and circumferentially away from the core relative to the central axis from the root to the tip, the leading tab located within the recess and having;

a radially-inner edge face at the tip, the radially-inner edge face facing the recess and facing a radially inward direction towards the central axis;

a lateral edge face extending in a direction having a radial component relative to the central axis from the core towards the tip, the lateral edge face facing a direction having an axial component relative to the central axis; and a fillet at an intersection between the radially-inner edge face and the lateral edge face of the leading tab, the fillet at least partially received inside the recess and facing the step, the fillet configured to abut the step during a movement of the leading tab in a blade removal direction opposite the blade insertion direction.

14. The turbine section of claim 13, wherein the step has a height taken in a radial direction relative to the central axis, the fillet having a radius greater than the height and/or wherein the radius is at most a width of the leading tab taken along the blade insertion direction.

15. The turbine section of claim 13, wherein the leading tab is axially aligned with the recess and defines the fillet.

16. The turbine section of claim 13, wherein the leading tab is a first lateral leading tab protruding from the core transversally to the blade insertion direction.

17. The turbine section of claim 16, wherein the leading tabs includes a second lateral leading tab protruding from the core transversally to the blade insertion direction and away from the first lateral leading tab, the second lateral leading tab being axially offset from the first lateral leading tab, the second lateral leading tab axially offset from the recess.

18. A feather seal for a rotor assembly of an aircraft engine, the feather seal comprising:

a core extending along a longitudinal axis from a leading end to a trailing end and along a transversal axis from a first side to a second side, the transversal axis being perpendicular to the longitudinal axis, the feather seal having a seal insertion direction extending from the trailing end to the leading end;

tabs protruding from the core from roots at the core to tips, the tips being offset from the roots along a vertical direction normal to the longitudinal axis, the tabs including trailing tabs; and leading tabs axially forward of the trailing tabs relative to the seal insertion direction, a leading tab of the leading tabs extending away from the core along a tab direction having a component along a vertical axis being normal to both of the transversal axis and the longitudinal axis from a root at the core to a tip, the leading tab defining:

a tip edge face at the tip, the tip edge face facing away from the core;

a lateral edge face intersecting the tip edge face, the lateral edge face facing a direction having a component parallel to the longitudinal axis; and a fillet at an intersection between the tip edge face and the lateral edge face.

19. The feather seal of claim 18, wherein the intersection is free of a sharp corner.

20. The feather seal of claim 18, wherein a ratio of a radius of the fillet to a length of the leading tab from the corresponding tip to a corresponding root of the roots ranges from 0.25 to 0.75.

* * * * *